United States Patent

Kakegawa et al.

Patent Number: 5,455,292
Date of Patent: Oct. 3, 1995

[54] HYDROLYTICALLY STABLE, HALOGEN-FREE FLAME RETARDANT RESIN COMPOSITION

[75] Inventors: Junko Kakegawa, Chiba; Shigeki Takayama, Sodegaura, both of Japan

[73] Assignee: Asahi Kasei Kogyo Kabushiki Kaisha, Japan

[21] Appl. No.: 162,038

[22] PCT Filed: Aug. 4, 1993

[86] PCT No.: PCT/JP93/01096

§ 371 Date: Dec. 3, 1993

§ 102(e) Date: Dec. 3, 1993

[87] PCT Pub. No.: WO94/03535

PCT Pub. Date: Feb. 17, 1994

[30] Foreign Application Priority Data

Aug. 6, 1992 [JP] Japan ................. 4-209924

[51] Int. Cl.⁶ .................. C08K 5/52; C08L 71/12; C08L 69/00; C08L 25/06
[52] U.S. Cl. ................... 524/141; 524/127; 524/143
[58] Field of Search .................. 524/141, 127, 524/143

[56] References Cited

U.S. PATENT DOCUMENTS

| | | | |
|---|---|---|---|
| 4,343,732 | 8/1982 | Zama et al. | 524/127 |
| 4,683,255 | 7/1987 | Sugio et al. | 524/151 |
| 4,808,647 | 2/1989 | Abolins et al. | 524/142 |
| 4,900,768 | 2/1990 | Abolins et al. | 524/142 |
| 4,910,241 | 3/1990 | Abolins et al. | 524/142 |
| 4,933,386 | 6/1990 | Nitoh et al. | 524/127 |
| 4,945,018 | 7/1990 | Abolins et al. | 524/141 |
| 5,011,736 | 4/1991 | Abolins et al. | 524/142 |
| 5,135,973 | 8/1992 | Fukasawa et al. | 524/127 |

FOREIGN PATENT DOCUMENTS

| | | |
|---|---|---|
| 0007460 | 2/1980 | European Pat. Off. |
| 0129824 | 1/1985 | European Pat. Off. |
| 0129825 | 1/1985 | European Pat. Off. |
| 0135726 | 4/1985 | European Pat. Off. |
| 0521628A2 | 1/1993 | European Pat. Off. |
| 58-76447 | 5/1983 | Japan |
| 59-100158 | 6/1984 | Japan |
| 60-58463 | 4/1985 | Japan |
| 60-137944 | 7/1985 | Japan |
| 91231 | 5/1986 | Japan |
| 2-11650 | 1/1990 | Japan |
| 3-212449 | 9/1991 | Japan |
| 4-46945A | 2/1992 | Japan |
| 0101210A | 2/1993 | Netherlands |
| 2043083 | 3/1979 | United Kingdom |

Primary Examiner—Thomas Hamilton, III
Attorney, Agent, or Firm—Pennie & Edmonds

[57] ABSTRACT

The present invention provides a resin composition comprising:

(A) at least one thermoplastic resin not having halogen selected from the group consisting of a polyphenylene ether resin, a polycarbonate resin, a polystyrene resin, a polyolefin resin, a polyamide resin and a thermoplastic elastomer; and (B) a phosphoric acid ester compound represented by general formula I:

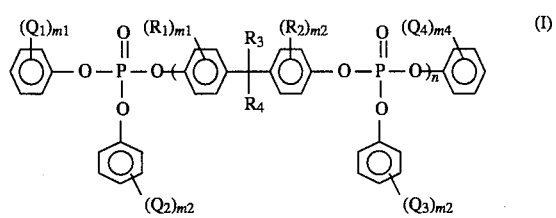

wherein $Q_1$, $Q_2$, $Q_3$ and $Q_4$ independently represent an alkyl group having 1 to 6 carbon atoms; $R_1$, $R_2$, $R_3$ and $R_4$ independently represent a methyl group or a hydrogen atom; n represents an integer of 1 or more; n1 and n2 independently represent an integer of 0 to 2; and m1, m2, m3 and m4 independently represent an integer of 1 to 3.

According to the present invention, a resin composition excellent in flame retardance can be obtained. A flame retardant agent contained in the resin composition does not cause smoking or volatilize during a molding processing and also does not bleed to the surface of the moldings. Moldings of the resin composition do not discolor, blister and deteriorate in electrical properties and the like due to water absorption.

20 Claims, No Drawings

HYDROLYTICALLY STABLE, HALOGEN-FREE FLAME RETARDANT RESIN COMPOSITION

TECHNICAL FIELD

The present invention relates to a resin composition which is excellent in flame retardance and is obtained by incorporating a specific phosphoric acid ester compound into a specific thermoplastic resin not having halogen (hereinafter, a non-halogenated thermoplastic resin). A flame retardant agent contained in the resin composition does not cause smoking or volatilize during a molding processing and also does not bleed to the surface of the moldings. Moldings of the resin composition do not discolor, blister and deteriorate in electrical properties and the like due to water absorption.

BACKGROUND ART

A synthetic resin is widely used as a material for construction of buildings, electrical machinery and devices, automobiles and fibers because it is generally light, excellent in water and chemical resistance, has excellent electrical insulating and mechanical properties, and is easy to mold. However, a synthetic resin has the drawback that it is more flammable than a metallic or inorganic material. Consequently, various methods for imparting flame retardance to a synthetic resin have been proposed. Of these, a method of incorporating a halogen compound, a phosphorus compound, an inorganic hydrate and the like into the synthetic resin is most widely used. Particularly, an organic phosphoric acid ester compound such as triphenyl phosphate, cresyl diphenyl phosphate, or tricresyl phosphate is widely used industrially. However, conventionally used flame retardant agents have drawbacks in causing smoking and volatilizing during the molding processing, bleeding to the surface of moldings and the like.

In order to alleviate the above drawbacks in practice, it has been attempted to use a phosphoric acid ester compound having high molecular weight as a flame retardant agent. For example, European Patent Unexamined Publication No. 7,460 discloses a tri(2,6-dimethylphenyl)phosphate compound; European Patent Unexamined Publication Nos. 129,824, 129,825 and 135,726 and British Patent Unexamined Publication No. 2,043,083 disclose a resorcinol-bisdiphenyl phosphate compound and the like; and U.S. Pat. No. 4,683,255 discloses a tribiphenyl phosphate compound. However, large amounts of these phosphoric acid ester compounds must be used in order to impart flame retardance to the resin. Further, according to our research findings, these phosphoric acid ester compounds do not satisfy recently established standards because they cause corrosion during molding, they are denatured during molding or during prolonged use of the moldings, and cause the moldings to discolor, blister and deteriorate in electrical properties and flame retardance due to water absorption and the like.

Thus, the art has not been able to provide a resin composition possessing both sufficient flame retardance and performance as a product.

DISCLOSURE OF THE INVENTION

The present invention provides a thermoplastic resin composition not having halogen (hereinafter, a non-halogenated thermoplastic resin composition), which is free from problems such as denaturation, volatilization and bleeding of the flame retardant agent, has excellent flame retardance and maintains its initial properties during prolonged use, when recycled or when used under other more severe conditions. The present invention not only provides a resin composition having excellent properties, but also solves global environmental problems by imparting flame retardance to the resin with a flame retardant agent not containing halogen; market demand for such resins is increasing because they are environmentally friendly and safe to use.

The present invention provides a composition comprising a specific non-halogenated thermoplastic resin (component (A)) and a specific phosphoric acid ester compound (component (B)). In particular, the structure of component (B) of the present invention contains a specific linker derived from a bis(hydroxyaryl)alkane and an alkyl-substituted phenyl moieties at the terminal so that a resin composition excellent in flame retardance, wherein the flame retardant agent, i.e., component (B), does not cause smoking and/or volatilize during a molding processing and does not bleed to the surface of moldings, can be obtained by incorporating component (B) into component (A). Moldings of this resin composition do not discolor, blister or deteriorate in electrical properties due to water absorption. The moldings are suitable for prolonged use as well as recycling.

Thus, the present invention provides a resin composition comprising:

(A) at least one non-halogenated thermoplastic resin selected from the group consisting of a polyphenylene ether resin, a polycarbonate resin, a polystyrene resin, a polyolefin resin, a polyamide resin and a thermoplastic elastomer; and (B) a phosphoric acid ester compound represented by general formula I:

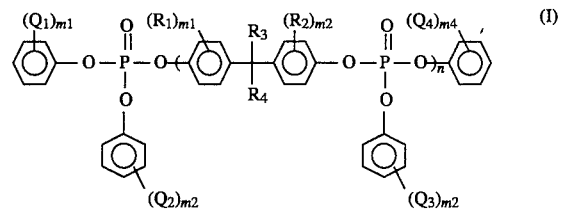

wherein $Q_1$, $Q_2$, $Q_3$ and $Q_4$ independently represent an alkyl group having 1 to 6 carbon atoms; $R_1$, $R_2$, $R_3$ and $R_4$ independently represent a methyl group or a hydrogen atom; n represents an integer of 1 or more; n1 and n2 independently represent an integer of 0 to 2; and m1, m2, m3 and m4 independently represent an integer of 1 to 3.

Component (A) of the present invention is at least one non-halogenated thermoplastic resin selected from the group consisting of a polyphenylene ether resin; a polycarbonate resin; a polystyrene resin such as polystyrene, a rubber modified polystyrene, a copolymer of styrene and acrylonitirile (AS resin) and a rubber modified copolymer of styrene and acrylonitrile (ABS resin); a polyolefin resin such as polyethylene and polypropylene; a polyamide resin such as nylon 6, nylon 6,6, nylon 6,10 and nylon 12; and a thermoplastic elastomer.

The polyphenylene ether resin used as component (A) refers to a homopolymer or a copolymer having repeating units represented by general formula II-1 and/or II-2:

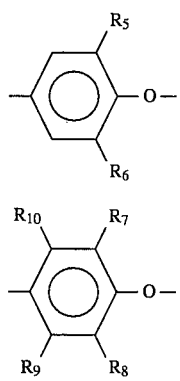

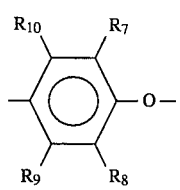

wherein $R_5$, $R_6$, $R_7$, $R_8$, $R_9$ and $R_{10}$ independently represent an alkyl group having 1 to 4 carbon atoms, an allyl group and a hydrogen atom, but $R_9$ and $R_{10}$ do not represent hydrogen atoms at the same time.

Representative examples of the homopolymers of the polyphenylene ether resins include poly(2,6-dimethyl-1, 4phenylene)ether, poly(2-methyl-6-ethyl-1,4-phenylene)ether, poly(2,6-diethyl-1,4-phenylene)ether, poly(2-ethyl-6 -n-propyl-1,4-phenylene)ether, poly(2,6-di-n-propyl-1,4-phenylene)ether, poly(2-methyl-6-n-butyl-1,4-phenylene)ether, poly(2-ethyl-6 -isopropyl-1,4-phenylene)ether, poly(2-methyl-6 -hydroxyethyl-1,4-phenylene)ether and the like.

Of these, poly(2,6-dimethyl-1,4-phenylene)ether is preferred.

The polyphenylene ether copolymer refers to a copolymer having a phenylene ether structure as a main monomer unit. Examples include a copolymer of 2,6-dimethylphenol and 2,3,6-trimethylphenol, of 2,6-dimethylphenol and o-cresol, of 2,6-dimethylphenol, of 2,3,6-trimethylphenol and o-cresol and of the like.

The polycarbonate resin used as component (A) is a polymer having repeating units represented by general formula III:

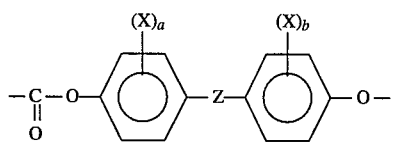

wherein Z represents a bond or an alkylene having 1 to 8 carbon atoms, an alkylidene having 2 to 8 carbon atoms, a cycloalkylene having 5 to 15 carbon atoms, $SO_2$, SO, O, CO or a group represented by formula III-1; X represents a hydrogen atom or an alkyl group having 1 to 8 carbon atoms; and a and b independently represent an integer of 0 to 4.

The polycarbonate resin can be produced, for example, by a method comprising the reaction of a bifunctional phenol and a carbonate precursor such as phosgene or another carbonate such as diphenylcarbonate in a solvent such as methylene chloride in the presence of known acid-acceptors and molecular weight modifiers.

The bifunctional phenols herein used include 2,2-bis(4 -hydroxyphenyl)propane (bisphenol A), hydroquinone, 4,4'-dihydroxydiphenyl, a bis(4-hydroxyphenyl)alkane, a bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether and the like. These bifunctional phenols can be used alone or in combination. Of these, bisphenol A and a mixture of bisphenol A and other bifunctional phenols are preferred. Bisphenol A is most preferred. Instead of these bifunctional phenols, a homopolymer of the bifunctional phenol, a copolymer of the two or more bifunctional phenols or a mixture of the homopolymer and the copolymer may be used.

The polycarbonate resin to be used in the present invention may include a thermoplastic random ramification polycarbonate obtained by reacting a multifunctional aromatic compound with the bifunctional phenol and/or the carbonate precursor.

The polystyrene resin to be used as component (A) refers a vinyl aromatic polymer and a rubber modified vinyl aromatic polymer.

The vinyl aromatic polymers include a polymer of styrene, of alkyl substituted styrene such as o-methylstyrene, p-methylstyrene, m-methylstyrene, 2,4-dimethylstyrene, ethylstyrene and p-tert-butylstyrene, and of α-alkyl substituted styrene such as α-methylstyrene and -methyl-p-methylstyrene; a copolymer containing sections of at least one of the above polymers and sections of at least one polymer derived from other vinyl compounds, and a copolymer consisting of two or more of the above polymers. Compounds copolymerizable with the vinyl aromatic compound include a methacrylic acid ester such as methyl methacrylate, ethyl methacrylate, an unsaturated nitrile compound such as acrylonitrile and methacrylonitrile, and an acid anhydride such as maleic anhydride. Of these, polystyrene and an AS resin are particularly preferred.

Rubber used for a rubber modified vinyl aromatic polymer includes polybutadiene, a copolymer of styrene and butadiene, polyisoprene, a copolymer of butadiene and isoprene, natural rubber, a copolymer of ethylene and propylene and the like. Of these, polybutadiene and the copolymer of styrene and butadiene are preferred. Of the rubber modified vinyl aromatic copolymers, a rubber modified polystyrene (HIPS) and an ABS resin are preferred.

The polyolefin resins to be used as component (A) include a homopolymer such as a high density polyethylene, an ultrahigh molecular weight and high density polyethylene, a low molecular weight polyethylene, a linear low density polyethylene, an ultralow density polyethylene having a specific gravity of less than 0.90, polypropyrene, poly(4-methyl-1 -pentene), polybutene-1; and a copolymer of at least two compounds selected from ethylene, propylene, other α-olefins, an unsaturated carboxylic acid and a derivative thereof, for example, a copolymer of ethylene and 1-butene, a copolymer of ethylene and methacrylic acid or acrylic acid, a copolymer of ethylene and a methacrylic acid ester or acrylic acid ester, a random or block copolymer of propylene and ethylene, a copolymer of propylene and 1-hexene and a copolymer of propylene and 4-methyl-1-pentene. These polyolefin resins can be used alone or in combination.

The polyamide resin to be used as component (A) refers to a heat-meltable polymer which has a unit represented by general formula IV in the main chain of the polymer:

polyamide resin includes nylon 4, nylon 6, nylon 6,6, nylon 12, nylon 6,10, a polyamide obtained from a terephthalic acid and trimethylhexamethylenediamine, a polyamide obtained from an adipic acid and methaxylenediamine, a polyamide obtained from an adipic acid, an azelaic acid and 2,2-bis(p-aminocyclohexyl)-propane, and a polyamide obtained from an terephthalic acid and 4,4'-diaminocyclohexylmethane. These polyamides can be used alone or in the form of a copolymer of at least two polyamides or as a mixture of the polyamide and the copolymer.

The thermoplastic elastomers to be used as component (A) include a block copolymer of styrene and butadiene, a block copolymer of styrene and butadiene wherein the butadiene-derived units are partially or wholly hydrogenated, an elastomer of ethylene and propylene, a styrene grafted elastomer of ethylene and propyrene, a thermoplastic polyester elastomer, an ionomer resin, a core-shell polymer having a rubbery core and a non-rubbery shell. Of these, the block copolymer of styrene and butadiene and a block copolymer of styrene and butadiene wherein the butadiene-derived units are partially or wholly hydrogenated are preferred.

The above non-halogenated thermoplastic resins can be mixed for use. Of these, the polyphenylene ether resin and the aromatic polycarbonate resin exhibit high flame retardance when the phosphoric acid ester compound is added. Therefore, when these resins are used alone or in combination with other resins as component (A) above, the most preferred composition can be obtained as a non-halogenated flame retardant material. Resins to be mixed with the above non-halogenated thermoplastic resin include non-halogenated resins such as polyethylene terephthalate, polybutylene terephthalate, an acrylic resin, polyvinyl alcohol, polyvinyl acetate, a polyacetal, a phenolic resin and phenolic novolak. However, they are not limited to the non-halogenated resins listed above. Examples of resin compositions obtained by mixing the above non-halogenated thermoplastic resins include a resin composition of a polyphenylene ether resin and a polystyrene resin, of a polyphenylene ether resin and a polyolefin resin, of a polyphenylene ether resin and a polyamide resin, of a polycarbonate resin and a polystyrene resin, and of a polyamide resin and a polystyrene resin.

Hereinafter, the phosphoric acid ester compound to be used as component (B) in the present invention is described. The phosphoric acid ester compound to be used in the present invention is represented by general formula I:

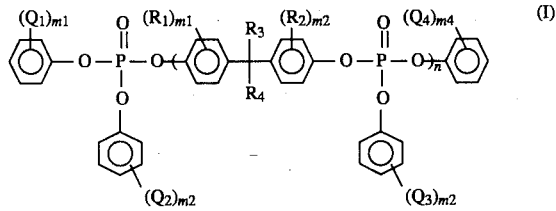

wherein $Q_1$, $Q_2$, $Q_3$ and $Q_4$ independently represent an alkyl group having 1 to 6 carbon atoms $R_1$, $R_2$, $R_3$ and $R_4$ independently represent a methyl group or a hydrogen atom; n represents an integer of 1 or more; n1 and n2 independently represent an integer of 0 to 2; and m1, m2, m3 and m4 independently represent an integer of 1 to 3.

Preferably, at least one of $Q_1$, $Q_2$, $Q_3$ and $Q_4$ in general formula I represents a methyl group. More preferably, all of $Q_1$, $Q_2$, $Q_3$ and $Q_4$ represent methyl groups.

In general formula I, n represents an integer of 1 or more. Heat resistance and processing properties depend on the n value. Preferably, n represents an integer of 1 to 5. A mixture of the phosphoric acid ester compounds having different n values is acceptable.

The structure of phosphoric acid ester compound of component (B) of the present invention contains a specific linker derived from a bis(hydroxyaryl)alkane and alkyl-substituted phenyl moieties at the terminal.

The specific bis(hydroxyaryl)alkanes useful as linker precursors include bisphenols such as bisphenol A, 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. However, they are not limited to the bisphenols. Of these, bisphenol A is preferred.

As the alkyl substituted monofunctional phenol to be used to introduce the terminal alkyl-substituted phenyl moieties, a monoalkylphenol, a dialkylphenol and a trialkylphenol are used alone or in combination. Of these, cresol, a dimethylphenol (mixed xylenol), 2,6-dimethylphenol and trimethyl phenol are preferred.

Further, the phosphoric acid ester compound of component (B) contains a compound represented by general formula V:

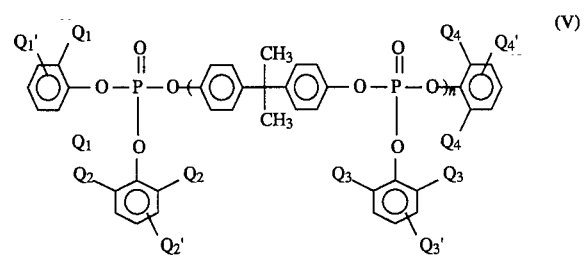

wherein $Q_1$, $Q_2$, $Q_3$ and $Q_4$ independently represent an alkyl group having 1 to 6 carbon atoms; $Q_1'$, $Q_2'$, $Q_3'$ and $Q_4'$ independently represent a hydrogen atom or an alkyl group having 1 to 6 carbon atoms; and n represents an integer of 1 or more.

The volatility of the phosphoric acid ester compounds of component (B) is extremely low due to the linker discussed above present in the structure of the molecules. Moreover, the phosphoric acid ester compound of component (B) exhibits high performance not achieved by conventional polyphosphate structures wherein two or more phosphate groups are linked by hydroxyarenes such as those derived from resorcinol or a hydroquinone. Specifically, the present resin composition can inhibit discoloration, blister and electrical breakdown due to water absorption, which occur at an exposure test conducted by using a resin composition containing the conventional polyphosphate at high temperature and humidity. By using a monoalkylphenol, a dialkylphenol and a trialkylphenol as an alkyl substituted monofunctional phenol, the resin composition of the present invention attains improved heat stability and resistance to hydrolysis compared to a resin composition employing a phosphoric acid ester compound having an unsaturated monofunctional at the terminal. Monofunctional phenols containing 1 to 3 alkyl substitutents produce phosphoric acid ester compounds remarkably resistant to hydrolysis. As mentioned above, component (B) contains a specific linker from a bis(hydroxyaryl)alkane and alkyl-substituted phenyl moieties at the terminal. Accordingly, an excellent resin composition, which maintains its initial properties even when the resin composition contacts water under heat atmosphere, can be obtained by using component (B).

Conventional organic phosphoric acid ester compounds having merely high molecular weight, such as resorcinolpolyphosphate and hydroquinone polyphosphate are inferior in heat stability and cause problems such as gelation due to a reaction between the phosphoric acid ester compound and the non-halogenated thermoplastic resin, so that a non-halogenated resin composition employing the conventional organic phosphoric acid ester compounds cannot be processed at high temperatures without losses. Further, an acid such as a phosphoric acid is produced during decomposition of the phosphoric acid ester compound, which promotes decomposition of the non-halogenated thermoplastic resin composition to decrease its molecular weight and to deteriorate its physical properties; thus, these phosphoric acid ester compounds tend to lack durability. Furthermore, decomposing phosphoric acid ester compounds corrode the metallic parts of processing machines used in molding as well as the metallic parts of a products in contact with the moldings.

The resin composition of the present invention is prepared by combining the phosphoric acid ester compound of component (B) of the present invention, which is excellent not only in resistance to hydrolysis but also in heat stability, with the non-halogenated thermoplastic resin composition. As a result, it is not only free from the problems that the flame retardant agent causes smoking or volatilizers during a molding processing and that moldings of the resin composition deteriorate in electrical properties due to water absorption. Also, it solves the problem of corrosion of the metallic parts of a molding processing machine and the metallic parts of the product in contact with the molding, by remarkably inhibiting hydrolytic decomposition of the resin composition.

The phosphoric acid ester compound of component (B) can be obtained by reacting the specific bifunctional phenol and the alkyl substituted monofunctional phenol with phosphorus oxychloride. Methods for obtaining the phosphoric acid ester compound are not limited to this method.

In the present invention, at least one monophosphoric acid ester compound of component (C) represented by general formula VI:

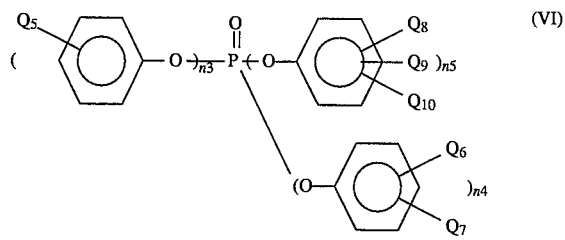

wherein $Q_5$, $Q_6$, $Q_7$, $Q_8$, $Q_9$ and $Q_{10}$ independently represent a hydrogen atom or an alkyl group having 1 to 9 carbon atoms; and n3, n4 and n5 independently represent an integer of 0 to 3, and the total of n3, n4 and n5 is 3, can be used with the above phosphoric acid ester compound of component (B). When at least one of the monophosphoric acid ester compounds is used with component (B), smoking during a molding processing and bleeding are more effectively inhibited than the case that the amount of the monophosphoric acid ester compound is merely reduced, and flame retardance is not reduced compared with the case that components (B) and (C) are individually used. Further, when both the phosphoric acid ester compounds are used, handling becomes easier and a more inexpensive resin composition can be obtained. Monophosphoric acid ester compounds as components (C) include triphenylphosphate, tri-cresylphosphate, cresyldiphenylphosphate, trixylenylphosphate, xylenyldiphenylphosphate, tri(isopropylphenyl)phosphate, isopropylphenyl diphenylphosphate, diisopropylphenyl phenylphosphate, tri(trimethylphenyl)phosphate, tri(t-butylphenyl)phosphate and the like. Of these, triphenylphosphate, tricresylphosphate and cresyldiphenylphosphate are preferred.

A mixing ratio of the non-halogenated thermoplastic resin of component (A) and the phosphoric acid ester compound of component (B) which are used for the resin composition of the present invention is not particularly limited as long as the effect of the invention is sufficiently exhibited. However, when a mixing ratio of component (B) is extremely low, flame retardance is poor. When it is extremely high, heat resistance and the like of the resin are reduced. An amount of component (B) is preferably 1 to 200 parts by weight, more preferably 1 to 100 parts by weight, based on 100 parts by weight of component (A). The mixing ratio of the phosphoric acid ester compounds of components (B) and (C) is not particularly limited if the effect of the invention is not impaired. Preferably, the ratio is 30 to 100% by weight of the phosphoric acid ester compound of component (B) and 0 to 70% by weight of the monophosphoric acid ester compound of component (C), based on the total amount of the phosphoric acid ester compound of component (B) and the monophosphoric acid ester compound of component (C).

The composition of the present invention can be kneaded using generally known kneading machines such as an extruder, a heating roll, a kneader, or a Banbury mixer.

Other flame retardant agents can be used together with the above flame retardant agent in the range where the effect of the present invention is not impaired. Representative examples of other flame retardant agents include known organic halogen compounds such as decabromodiphenylether, tetrabromobisphenol A, hexabromobenzene, hexabromocyclododecane, perchlorocyclodecane; inorganic halogen compounds such as ammonium bromide; organic or inorganic phosphorus compounds such as red phosphorus, polyphosphoric acid and ammonium phosphate; a halogen-containing phosphorus compound such as tris(halopropyl)phosphate and tris(haloethyl)phosphate; a nitrogen-containing phosphorus compound such as a phosphonitrilic chloride derivative and a phosphonoamide; nitrogen compounds such as melamine, uric acid, methylol melamine, dicyandiamide, a melamine-formaldehyde resin, a urea formaldehyde resin, and a triazine compound; an inorganic hydrate such as magnesium hydroxide, aluminium hydroxide, dawsonite; an inorganic compound such as antimony oxide, barium metaborate hydroxoantimonate, zirconium oxide, zirconium hydroxide, molybdenum oxide, ammonium molybdate, zinc borate, ammonium borate, barium metaborate and tin oxide; and agents for inhibiting drop such as polytetrafluoroethylene and a siloxane compound.

Further, the resin composition may contain other additives such as a plasticizer, a release agent, an ultraviolet absorber, an antioxidant, a stabilizer such as a light stabilizer, and a dye and pigment in the range where the effect of the invention is not impaired. Additionally, fillers such as a glass fiber, a glass chip, a glass bead, a carbon fiber, wallastonite, calcium carbonate, talc, mica, woodflour, slate flour and fibrous asbestos can be added.

BEST MODE FOR CARRYING OUT THE INVENTION

Hereinafter, the present invention is illustrated by Examples, but these are not intended to limit the scope of the invention. The phosphoric acid ester compounds used in the Examples are shown in Table 1.

Example 1

Pellets were obtained by melt kneading 100 parts by weight of poly(2,6-dimethyl-1,4-phenylene)ether (hereinafter, PPE) having an intrinsic viscosity (η) of 0.52 at 30° C. in chloroform and 18 parts by weight of phosphoric acid ester A with a twin-screw extruder whose cylinder temperature was set at 320° C. A test piece was obtained by injection molding the pellets at 300° C. and evaluated. The results are shown in Table 2.

A ⅛ inch test piece was evaluated for flame retardance according to the vertical flame test method prescribed in UL-94 to rank.

Resistance to hydrolysis of the composition was evaluated with a change in appearance, a water absorption ratio (wt. %) and flame retardance after the test piece was subjected to an exposure test at high temperature and humidity. The exposure test was conducted by exposing the test piece to saturated steam having a temperature of 120° C. and an atmospheric pressure of 2 atmosphere for 96 hours.

Volatilization of the composition was evaluated by visually observing an amount of smoking from a nozzle of an injection molding machine.

Example 2 and Comparative Examples 1 to 3

A test piece was obtained and evaluated according to the same manner as in Example 1 except that phosphoric acid ester A was substituted with a phosphoric acid ester shown in Table 2 or it was not incorporated. The results are shown in Table 2.

Example 3

The pellets obtained in Example 1 were kneaded with a Labo Plasto mill 30C-150 (manufactured by Toyo Seiki Seisakusho, Ltd.) under nitrogen atmosphere at 330° C. for 60 minutes. The resultant product was gel analyzed. The results are shown in Table 3. Gel analysis was conducted as follows. 0.5 g of a powder sample was subjected to 5-hour soxhlet extraction with chloroform. Undissolved gel was obtained by vacuum drying a residual part from the extraction and its ratio was shown by percentage based on a weight of the sample. A Whatman thimble made of celllose (CAT No. 2,800,189) was used for the extraction.

Comparative Example 4

The pellets obtained in Comparative Example 1 were evaluated according to the same manner as in Example 3. The results are shown in Table 3.

Example 4

Pellets were obtained by melt kneading 68 parts by weight of PPE used in Example 1, 24 parts by weight of a high-impact polystyrene resin (Asahi Chemical Polystyrene 492 manufactured by Asahi Chemical Industry Co., Ltd.) (hereinafter, HIPS 492), 8 parts by weight of a polystyrene resin (Asahi Chemical Polystyrene 685 manufactured by Asahi Chemical Industry Co., Ltd.) (hereinafter, GPPS), 14 parts by weight of phosphoric ester A and 0.3 part by weight of octadecyl-3-(3-5 -di-t-butyl-4-hydroxyphenyl)propionate with a twin-screw extruder whose cylinder temperature was set at 300° C. A test piece was obtained by injection molding the pellets at 280° C. and evaluated according to the same manner as in Example 1. The results are shown in Table 4.

Resistance to hydrolysis of the composition was evaluated by the change in appearance, the water absorption ratio (wt. %) measured, dielectrical strength and flame retardance of the test piece after the test piece was subjected to an exposure test at high temperature and humidity. The exposure test was conducted by exposing the test piece to saturated steam having a temperature of 120° C. and an atmospheric pressure of 2 atmosphere for 198 hours. Using a 1.2 mm thick test piece, the dielectrical strength was measured according to ASTM D 149.

Examples 5 and 6 and Comparative Examples 5 to 8

A test piece was obtained and evaluated according to the same manner as in Example 4 except that phosphoric acid ester A was substituted with a phosphoric acid ester shown in Tables 4-1 and 4-2 or it was not incorporated. The results are shown in Tables 4-1 and 4-2.

Example 7 and Comparative Example 9

According to the same manner as in Example 3, the pellets obtained in Example 4 or Comparative Example 5 were kneaded and the resultant product was gel analyzed. The results are shown in Table 5.

Example 8

A test piece was obtained and evaluated according to the same manner as in Example 4 except that the amounts of PPE, HIPS 492 and GPPS were respectively changed to 34 parts by weight, 57 parts by weight and 9 parts by weight. The results are shown in Table 6.

Resistance to hydrolysis of the composition was evaluated with a change in appearance and a water absorption ratio (wt. %) of the test piece after a hot water dipping test. The hot water dipping test was conducted by dipping the test piece in hot water at 80° C. for 600 hours.

Example 9 and Comparative Examples 10 and 11

A test piece was obtained and evaluated according to the same manner as in Example 8 except that phosphoric acid ester A was substituted with a phosphoric acid ester shown in Table 6. The results are shown in Table 6.

Example 10

A flow time of a phosphoric acid ester at 55° C. was measured by using a Ubbellohde viscometer. Akinematic viscosity was calculated by multiplying the time by a constant of the viscometer. Then, a viscosity was calculated in accordance with the following equation:

A viscosity (cp)=ν×ρ

ν: kinematic viscosity (cst) of phosphate A at 55° C.

ρ: density (g/cm$^2$) of phosphate A at 55° C.

A test piece was obtained by melt kneading 65 parts by weight of PPE used in Example 1, 23 parts by weight of HIPS 492 used in Example 4, 12 parts by weight GPPS used in Example 4, 0.3 part by weight of octadecyl-3-(3-5-di-t-butyl-4 -hydroxyphenyl)propionate and 12 parts by weight of phosphoric acid ester A and injection molding according to the same manner as in Example 4. The resultant test piece was evaluated. The results are shown in Table 7.

Examples 11 to 15 and Comparative Examples 12 to 15

A mixture of phosphoric acid esters was produced by mixing the phosphoric acid esters shown in Table 7 in the ratio shown in Table 7. A test piece was obtained and evaluated according to the same manner as in Example 10 except that phosphoric acid ester A was substituted with a mixture of the phosphoric acid esters. The results are shown in Table 7.

Example 16

A test piece was obtained and evaluated according to the same manner as in Example 10 except that a flow time of phosphoric acid ester A was measured at 25° C. The results are shown in Table 8.

Examples 17 to 21 and Comparative Examples 16 to 19

A mixture of phosphoric acid esters was produced by mixing the phosphoric acid esters shown in Table 8 in the ratio shown in Table 8 except for Comparative Examples 16 and 17. A test piece was obtained and evaluated according to the same manner as in Example 16 except that phosphoric acid ester A was substituted with the mixture of phosphoric acid esters or phosphoric acid ester G in the amount shown in Table 8. The results are shown in Table 8.

Example 22

Pellets were obtained by melt kneading 100 parts by weight of a polycarbonate resin (Iupilon E-2000 manufactured by Mitsubishi Gas Chemical Co., Inc.) and 35 parts by weight of phosphoric acid ester A with a twin-screw extruder whose cylinder temperature was set at 250° C. A test piece was obtained by injection molding the pellets at 220° C. and evaluated for flame retardance according to the same manner as in Example 1. The results are shown in Table 9.

Resistance to hydrolysis was evaluated with a change in appearance of the test piece after a hot water dipping test. The hot water dipping test was conducted by dipping the test piece in hot water at 70° C. for 96 hours.

Comparative Example 20

A test piece was obtained and evaluated according to the same manner as in Example 22 except that phosphoric acid ester A was substituted with phosphoric acid ester D. The results are shown in Table 9.

Comparative Example 21

A test piece was obtained by injection molding only the polycarbonate resin used in Example 22 at 320° C. The test piece was evaluated according to the same manner as in Example 22. The results are shown in Table 9.

Example 23

Preparation of ABS Resin 750 parts by weight (rubber conversion of 40 wt. %) of butadiene latex having an average particle diameter of 0.3 μm and 1 part by weight of an emulsifier (potassium rosinate) were charged into a polymerization tank and heated to 70° C. in a nitrogen gas current with stirring. Polymerization was conducted while a mixed solution comprising 200 parts by weight of acrylonitrile, 500 parts by weight of styrene, 0.8 part by weight of cumene hydroperoxide and 0.7 part by weight of t-dodecylmercaptan and an aqueous solution comprising dissolving 1.0 part by weight of sodium formaldehyde sulfoxylate, 0.10 part by weight of ferrous sulfate ($FeSO_2-H_2O$) and 0.2 part by weight of disodium ethylenediaminetetraacetate into 500 parts by weight of distilled water were added to the polymerization tank in 6 hours with stirring.

After the addition was complete, stirring was further continued for 2 hours to complete the polymerization. The conversion of monomers was 94%. An aqueous solution of dilute sulfuric acid was added to the reaction solution to agglomerate the formed latex of a graft copolymer. Then, the resultant latex was washed, dehydrated and dryed to obtain a white ABS resin.

Preparation of AS Resin 0.4 part by weight of potassium persulfate and 0.2 part by weight of potassium rosinate were added to 180 parts by weight of water and dissolved. 70 parts by weight of styrene, 30 parts by weight of acrylonitrile and 0.2 part by weight of dodecylmercaptan were added to the resultant solution and reacted at 70° C. for 4 hours to obtain an aromatic vinyl copolymer. The conversion of monomers was 94%. An aqueous solution of dilute sulfuric acid was added to the reaction solution to agglomerate the formed copolymer. Then, the resultant copolymer was washed, dehydrated and dryed to obtain a white AS resin.

Pellets were obtained by mixing 50 parts by weight of a polycarbonate resin having a weight average molecular weight of 25,000, 20 parts by weight of the ABS resin, 30 parts by weight of the AS resin and 10 parts by weight of phosphoric acid ester A with a Henschel mixer and then by melt kneading the resultant with a twin-screw extruder whose cylinder temperature was set at 250° C. A test piece was obtained by injection molding the pellets at 250° C. and evaluated for flame retardance. The results are shown in Table 10.

The evaluation of flame retardance was conducted by using an apparatus for horizontal flame test prescribed in UL-94. A ⅛ inch test piece was horizontally held and a flame was adjusted so that the blue flame without yellow tips be 1 inch high. The burning rate was measured after the end of the test piece was subjected to the flame for 30 seconds.

Comparative Example 22

A test piece was obtained and evaluated according to the same manner as in Example 23 except that phosphate ester was not incorporated. The results are shown in Table 10.

Example 24

Pellets were obtained by melt kneading 100 parts by weight of a high impact polystyrene (Asahi Chemical Polystyrene 433 manufactured by Asahi Chemical Industry Co., Ltd.) (hereinafter, HIPS 433) and 20 parts by weight of phosphoric acid ester A with a twin-screw extruder whose cylinder temperature was set at 200° C. A test piece was obtained by injection molding the pellets at 180° C. and evaluated for flame retardance. The results are shown in Table 11.

The evaluation of flame retardance was conducted by using an apparatus for horizontal flame test prescribed in UL-94. A ⅛ inch test piece was horizontally held and a flame was adjusted so that the blue flame without yellow tips be 1 inch high. The flame-out time was measure after the end of the test piece was subjected to the flame for 30 seconds.

Comparative Example 23

A test piece was obtained by injection molding only HIPS 433 used in Example 24 at 200° C. and evaluated according to the same manner as in Example 24. The results are shown in Table 11.

Example 25

Pellets were obtained by mixing, with a Henschel mixer, 34 parts by weight of polypropylene (Asahi Chemical Polypro E4201 manufactured by Asahi Chemical Industry Co., Ltd.), 40 parts by weight of PPE used in Example 1, 8 parts by weight of thermoplastic elastomer A (having a polystyrene-(hydrogenated polybutadiene)-polystyrene structure, an amount of bond styrene of 75%, a number average molecular weight of 142,000, a molecular-weight distribution of 1.05, an amount of 1,2-vinyl bond of polybutadiene before hydrogenation of 40%, and a hydrogenation ratio of polybutadiene of 99.9%), 12 parts by weight of thermoplastic elastomer B (having a polystyrene(hydrogenated butadiene)-polystyrene structure, an amount of bond styrene of 33%, a number average molecular weight of 172,000, a molecular-weight distribution of 1.05, an amount of 1,2-vinyl bond of polybutadiene before hydrogenation of 40%, and a hydrogenation ratio of polybutadiene of 99.9%), 6 parts by weight of paraffin oil (DIANA Process oil PW-380 manufactured by Idemitsu Kosan Co., Ltd.) and 25 parts by weight of phosphoric acid ester A and by melt kneading the resultant with a twin-screw extruder whose cylinder temperature was set at 280° C. A test piece was obtained by injection molding the pellets at 280° C. and evaluated. The results are shown in Table 12.

Flame retardance was evaluated according to a horizontal flame test prescribed in UL-94 to measure flame-out time.

Resistance to hydrolysis was evaluated by a change in appearance and a water absorption ratio (wt. %) of the test piece after the test piece was subjected to an exposure test at high temperature and humidity. The exposure test was conducted by exposing the test piece to saturated steam having a temperature of 120° C. and an atmospheric pressure of 1.2 atmosphere for 196 hours.

Comparative Examples 24 and 25

A test piece was obtained and evaluated according to the same manner as in Example 25 except that phosphoric acid ester A was substituted with phosphoric acid ester D or it was not incorporated. The results are shown in Table 12.

Example 26

Pellets were obtained by melt kneading 50 parts by weight of nylon 6 (Bright manufactured by Asahi Chemical Industry Co., Ltd.), 35 parts by weight of PPE used in Example 1, 15 parts by weight of thermoplastic elastomer C (Tufprene 200 manufactured by Asahi Chemical Industry Co., Ltd.), 25 parts by weight of phosphoric acid ester A and 0.5 part by weight of maleic anhydride with a twin-screw extruder whose cylinder temperature was set at 280° C. A test piece was obtained by injection molding the pellets at 280° C. and evaluated for flame retardance according to the same manner as in Example 1. The results are shown in Table 13.

Comparative Example 26

A test piece was obtained and evaluated according to the same manner as in Example 26 except that phosphoric acid ester A was not incorporated. The results are shown in Table 13.

Industrial Applicability

The non-halogenated thermoplastic resin composition of the present invention is free from the problems such that the flame retardant agent is denatured, volatilizes and bleeds to the surface of moldings. Further, moldings obtained form the resin composition do not discolor, blister, or deteriorate in electrical properties due to water absorption and maintain their initial properties during prolonged use, when recycled or when used under other more severe conditions.

TABLE 1

| Name | Chemical Structure | Name | Chemical Structure |
|---|---|---|---|
| Phosphoric acid ester A(bispenol A-polycresylphosphate)Mixture of phosphoricacid esters (n = 1 to 3) | [structure] | Phosphoric acid ester D(resorcinolpolyphenylphosphate)Mixture of phosphoricacid esters (n = 1 to 3) | [structure] |
| Phosphoric acid ester B(bispenol A-polyxylenylphosphate)Mixture of phosphoricacid esters (n = 1 to 3) | [structure] | Phosphoric acid ester E(hydroquinonepolyphenylphosphate)Mixture of phosphoricacid esters (n = 1 to 3) | [structure] |
| Phsophoric acid ester C(bispenol A-poly(2,6-xylenyl phosphate)Mixture of phosphoricacid esters (n = 1 to 3) | [structure] | | |
| Phosphoric acid ester F(triphenylphosphate)(manufactured byDaihachi Chem. Ind.Co., Ltd.,Product name: TPP) | [structure] | Phosphoric acid ester G(tricresylphosphate)(manufactured byDaihachi Chem. Ind.Co., Ltd.;Product name: TCP) | [structure] |
| hem. Ind.Co., Ltd.;Product name: CDP) | [structure] | | |

TABLE 1-continued

| Name | Chemical Structure | Name | Chemical Structure |
|---|---|---|---|

TABLE 2

|  |  | Ex. 1 | Ex. 2 | Comp. Ex. 1 | Comp. Ex. 2 | Comp. Ex. 3 |
|---|---|---|---|---|---|---|
| (A) Non-halogenated thermoplastic resin: PPE (wt. part) |  | 100 | 100 | 100 | 100 | 100 |
| (B) Phosphoric acid ester (wt. part) | A bisphenol A-polycresyl phosphate | 18 | — | — | — | — |
|  | B bisphenol A-polyxylenyl phosphate | — | 18 | — | — | — |
|  | D resorcinol-polyphenyl phosphate | — | — | 18 | — | — |
|  | F triphenyl phosphate | — | — | — | 18 | — |
| Flame retardance (UL-94) |  | V-0 | V-0 | V-0 | V-0 | V-1 |
| Appearance change of a test piece after an exposure test at high temperature & humidity |  | No change | No change | Discoloration Blister | Discoloration | — |
| Water absorption after an exposure test at high temperature & humidity |  | 1.5 | 1.0 | 20.1 | 4.2 | — |
| Flame retardance (UL-94) after an exposure test at high temperature & humidity |  | V-0 | V-0 | V-2 | V-1 | — |
| Smoking amount (visual observation) |  | Almost none | Almost none | Almost none | Much | — |

TABLE 3

|  |  | Ex. 3 | Comp. Ex. 4 |
|---|---|---|---|
| (A) Non-halogenated thermoplastic resin: PPE (wt. part) |  | 100 | 100 |
| (B) Phosphoric acid ester (wt. part) | A bisphenol A-polycresyl phosphate | 18 | — |
|  | D resorcinol-polyphenyl phosphate | — | 18 |
| Gel analysis value (wt. %) | Before kneading | ≦3 | ≦3 |
|  | After kneading | ≦3 | 82 |

TABLE 4-1

|   |   |   | Ex. 4 | Ex. 5 | Ex. 6 | Comp. Ex. 5 |
|---|---|---|---|---|---|---|
| (A) | Non-halogenated thermoplastic (wt. part) | PPE | 68 | 68 | 68 | 68 |
|   |   | HIPS 492 | 24 | 24 | 24 | 24 |
|   |   | GPPS | 8 | 8 | 8 | 8 |
| (B) | Phosphoric acid ester (wt. part) | A bisphenol A-polycresyl phosphate | 14 | — | — | — |
|   |   | B bisphenol A-polyxylenyl phosphate | — | 14 | — | — |
|   |   | C bisphenol A-poly-(2,6-xylenyl) phosphate | — | — | 14 | — |
|   |   | D resorcinol-polyphenyl phosphate | — | — | — | 14 |
|   |   | E hydroquinone-polyphenyl phosphate | — | — | — | — |
|   |   | F triphenyl phosphate | — | — | — | — |
| Flame retardance (UL-94) | | | V-0 | V-0 | V-0 | V-0 |
| Appearance change of a test piece after an exposure test at high temperature & humidity | | | No change | No change | No change | Discoloration Blister |
| Water absorption after an exposure test at high temperature & humidity | | | 3 | 2 | 1 | 29 |
| Dielectrical strength after an exposure test at high temperature & humidity | | | 46 | 46 | 47 | 7 |
| Flame retardance (UL-94) after an exposure test at high temperature & humidity | | | V-0 | V-0 | V-0 | V-2 OUT* |
| Smoking amount (visual observation) | | | Almost none | Almost none | Almost none | Almost none |

Note: "V-2 OUT" means the standard V-2 is not satisfied.

TABLE 4-2

|   |   |   | Comp. Ex. 6 | Comp. Ex. 7 | Comp. Ex. 8 |
|---|---|---|---|---|---|
| (A) | Non-halogenated thermoplastic (wt. part) | PPE | 68 | 68 | 68 |
|   |   | HIPS 492 | 24 | 24 | 24 |
|   |   | GPPS | 8 | 8 | 8 |
| (B) | Phosphoric acid ester (wt. part) | A bisphenol A-polycresyl phosphate | — | — | — |
|   |   | B bisphenol A-polyxylenyl phosphate | — | — | — |
|   |   | C bisphenol A-poly-(2,6-xylenyl) phosphate | — | — | — |
|   |   | D resorcinol-polyphenyl phosphate | — | — | — |
|   |   | E hydroquinone-polyphenyl phosphate | 14 | — | — |
|   |   | F triphenyl phosphate | — | 14 | — |

TABLE 4-2-continued

|  | Comp. Ex. 6 | Comp. Ex. 7 | Comp. Ex. 8 |
|---|---|---|---|
| Flame retardance (UL-94) | V-0 | V-0 | V-2 OUT* |
| Appearance change of a test piece after an exposure test at high temperature & humidity | Discoloration Blister | Discoloration | — |
| Water absorption after an exposure test at high temperature & humidity | 13 | 11 | — |
| Dielectrical strength after an exposure test at high temperature & humidity | 9 | 11 | — |
| Flame retardance (UL-94) after an exposure test at high temperature & humidity | V-2 | V-2 OUT* | — |
| Smoking amount (visual observation) | Almost none | Much | Almost none |

Note: "V-2 OUT" means the standard V-2 is not satisfied.

TABLE 5

|  |  |  | Ex. 7 | Comp. Ex. 9 |
|---|---|---|---|---|
| (A) Non-halogenated thermoplastic resin (wt. part) | | PPE | 68 | 68 |
| | | HIPS 492 | 24 | 24 |
| | | GPPS | 8 | 8 |
| (B) Phosphoric acid ester (wt. part) | A bisphenol A-polycresyl phosphate | | 14 | — |
| | D resorcinol-polyphenyl phosphate | | — | 14 |
| Gel analysis value (wt. %) | Before kneading | | ≦3 | ≦3 |
| | After kneading | | ≦3 | 78 |

TABLE 6

|  |  |  | Ex. 8 | Ex. 9 | Comp. Ex. 10 | Comp. Ex. 11 |
|---|---|---|---|---|---|---|
| (A) Non-halogenated thermoplastic resin (wt. part) | | PPE | 34 | 34 | 34 | 34 |
| | | HIPS 492 | 57 | 57 | 57 | 57 |
| | | GPPS | 9 | 9 | 9 | 9 |
| (B) Phosphoric acid ester (wt. part) | A bisphenol A-polycresyl phosphate | | 14 | — | — | — |
| | B bisphenol A-polyxylenyl phosphate | | — | 14 | — | — |
| | D resorcinol-polyphenyl phosphate | | — | — | 14 | — |
| | F triphenyl phosphate | | — | — | — | 14 |
| Flame retardance (UL-94) | | | V-0 | V-0 | V-0 | V-0 |
| Appearance change after a dipping test in hot water | | | No change | No change | Discoloration | Discoloration |
| Water absorption after a dipping test in hot water (wt. %) | | | 0.2 | 0.1 | 8.4 | 1.0 |
| Smoking amount (visual observation) | | | Almost none | Almost none | Almost none | Slightly much |

TABLE 7

|  |  | Ex. 10 | Ex. 11 | Ex. 12 | Ex. 13 | Ex. 14 | Ex. 15 | Comp. Ex. 12 | Comp. Ex. 13 | Comp. Ex. 14 | Comp. Ex. 15 |
|---|---|---|---|---|---|---|---|---|---|---|---|
| (B) | Phosphoric acid ester A (wt. part) | 12 | 10 | 8 | 6 | 8 | 8 | 0 | 0 | 0 | 0 |
| (C) | Monophosphoric acid ester (wt. part) | — | Phosphoric acid ester F | Phosphoric acid ester F | Phosphoric acid ester F | Phosphoric acid ester F | Phosphoric acid ester F | Phosphoric acid ester F | Phosphoric acid ester F | Phosphoric acid ester F | Phosphoric acid ester F |
|  |  |  | 2 | 4 | 6 | 2 | 2 | 12 | 6 | 6 | 3 |
|  |  | — | — | — | — | Phosphoric acid ester G | Phosphoric acid ester H | — | — | Phosphoric acid ester G | Phosphoric acid ester G |
|  |  |  |  |  |  | 2 | 2 |  |  | 6 | 3 |
| Flame retardance (UL-94 judgement) |  | V-0 | V-0 | V-0 | V-0 | V-0 | V-0 | V-0 | V-2 | V-0 | V-2 |
| Smoking amount (visual observation) |  | Almost none | Almost none | Almost none | Almost none | Almost none | Almost none | Remarkably much | Much | Remarkably much | Much |
| Viscosity of mixed phosphoric ester (55° C.) (c poise) |  | 1500 | 350 | 140 | 85 | 155 | 148 | 9.5 | 9.5 | 11.5 | 11.5 |

TABLE 8

|  |  | Ex. 16 | Ex. 17 | Ex. 18 | Ex. 19 | Ex. 20 | Ex. 21 | Comp. Ex. 16 | Comp. Ex. 17 | Comp. Ex. 18 | Comp. Ex. 19 |
|---|---|---|---|---|---|---|---|---|---|---|---|
| (B) | Phosphoric acid ester A (wt. part) | 12 | 10 | 8 | 6 | 8 | 8 | 0 | 0 | 0 | 0 |
| (C) | Monophosphoric acid ester (wt. part) | — | Phosphoric acid ester G | Phosphoric acid ester G | Phosphoric acid ester G | — | Phosphoric acid ester G | Phosphoric acid ester G | Phosphoric acid ester G | Phosphoric acid ester G | Phosphoric acid ester G |
|  |  |  | 2 | 4 | 6 |  | 2 | 12 | 6 | 6 | 3 |
|  |  | — | — | — | — | Phosphoric acid ester H | Phosphoric acid ester H | — | — | Phosphoric acid ester H | Phosphoric acid ester H |
|  |  |  |  |  |  | 4 | 2 |  |  | 6 | 3 |
| Flame retardance (UL-94 judgement) |  | V-0 | V-0 | V-0 | V-0 | V-0 | V-0 | V-0 | V-2 | V-0 | V-2 |
| Smoking amount (visual observation) |  | Almost none | Almost none | Almost none | Almost none | Almost none | Almost none | Remarkably much | Much | Remarkably much | Much |
| Viscosity of mixed phosphoric ester (25° C.) (c poise) |  | 4500 | 980 | 750 | 245 | 680 | 720 | 55 | 55 | 46 | 46 |

TABLE 9

|  |  | Ex. 22 | Comp. Ex. 20 | Comp. Ex. 21 |
|---|---|---|---|---|
| (A) | Non-halogenated thermoplastic resin: Polycarbonate resin (wt. part) | 100 | 100 | 100 |
| (B) | Phosphoric acid ester (wt. part) | Phosphoric acid ester A | Phosphoric acid ester D | — |
|  |  | 35 | 35 |  |
| Flame retardance (UL-94) | Judgement | V-0 | V-0 | V-2 OUT* |
| Appearance after a hydrolysis promotion test |  | No change | Not clear | No change |

Note: "V-2 OUT" means the standard V-2 is not satisfied.

TABLE 10

|  |  | Ex. 23 | Comp. Ex. 22 |
|---|---|---|---|
| (A) Non-halogenated thermoplastic resin (wt. part) | Polycarbonate resin | 50 | 50 |
|  | ABS resin | 20 | 20 |
|  | AS resin | 30 | 30 |
| (B) Phosphoric acid ester (wt. part) |  | Phosphoric acid ester A 10 | — |
| Flammability (horizontal flame test) | Burning rate (mm/sec) | 2.2 | 3.3 |
|  | Observation | No dripping | Much dripping |

TABLE 11

|  |  | Ex. 24 | Comp. Ex. 23 |
|---|---|---|---|
| (A) Non-halogenated thermoplastic resin: HIPS 433 (wt. part) |  | 100 | 100 |
| (B) Phosphoric acid ester (wt. part) |  | Phosphoric acid ester A 20 | — |
| Average flame-out time in a horizontal flame test (sec.) |  | 6.0 | 120 or more |

TABLE 12

|  |  | Ex. 25 | Comp. Ex. 24 | Comp. Ex. 25 |
|---|---|---|---|---|
| (A) Non-halogenated thermoplastic resin (wt. part) | Polypropylene | 34 | 34 | 34 |
|  | PPE | 40 | 40 | 40 |
|  | Thermoplastic elastomer A | 8 | 8 | 8 |
|  | Thermoplastic elastomer B | 12 | 12 | 12 |
| (B) Phosphoric acid ester (wt. part) |  | Phosphoric acid ester A 25 | Phosphoric acid ester D 25 | — |
| Average flame-out time in a horizontal flame test (sec.) |  | 44 | 46 | 120 or more |
| Appearance change after an exposure test at high temperature & humidity |  | No change | Discoloration | — |
| Water absorption after an exposure test at high temperature & humidity |  | 0.1 | 5.1 | — |

TABLE 13

|  |  | Ex. 26 | Comp. Ex. 26 |
|---|---|---|---|
| (A) Non-halogenated thermoplastic resin (wt. part) | Nylon 6 | 50 | 50 |
|  | PPE | 35 | 35 |
|  | Thermoplastic elastomer C | 15 | 15 |
| (B) Phosphoric acid ester (wt. part) |  | Phosphoric acid ester A 25 | — |
| Flame retardance (UL-94 judgement) |  | V-0 | V-2 OUT* |

Note: "V-2 OUT" means the standard V-2 is not satisfied.

What is claimed is:

1. A resin composition comprising:

(A) at least one thermoplastic resin not having halogen selected from the group consisting of a polyphenylene ether resin, a polycarbonate resin, a polystyrene resin, a polyolefin resin, a polyamide resin and a thermoplastic elastomer; and (B) a phosphoric acid ester compound represented by general formula I:

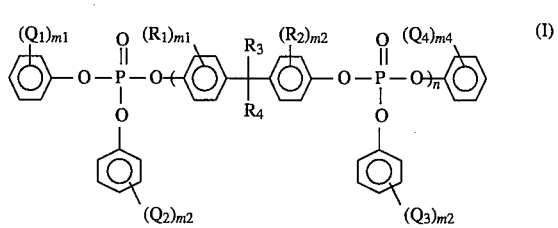

wherein $Q_1$, $Q_2$, $Q_3$ and $Q_4$ independently represent an alkyl group having 1 to 6 carbon atoms; $R_1$, $R_2$, $R_3$ and $R_4$ independently represent a methyl group or a hydrogen atom; n represents an integer of 1 or more; n1 and n2 independently represent an integer of 0 to 2; and m1, m2, m3 and m4 independently represent an integer of 1 to 3.

2. The resin composition according to claim 1, wherein an amount of the phosphoric acid ester compound of component (B) is in the range of from 1 to 200 parts by weight based on 100 parts by weight of the thermoplastic resin of component (A).

3. The resin composition according to claim 1 or 2, wherein $n_1$ and $n_2$ are 0 and $R_3$ and $R_4$ are methyl groups in the phosphoric acid ester of component (B).

4. The resin composition according to claim 1 or 2, wherein the thermoplastic resin of component (A) is a polyphenylene ether.

5. The resin composition according to claim 1 or 2, wherein the thermoplastic resin of component (A) is a polycarbonate resin.

6. The resin composition according to claim 1 or 2, wherein the thermoplastic resin of component (A) is a polystyrene resin.

7. The resin composition according to claim 1 or 2, wherein the thermoplastic resin of component (A) is a polyolefin resin.

8. The resin composition according to claim 1 or 2, wherein the thermoplastic resin of component (A) is a polyamide resin.

9. The resin composition according to claim 1 or 2, wherein the thermoplastic resin of component (A) is a resin composition comprising a polyphenylene ether resin and a polystyrene resin.

10. The resin composition according to claim 1 or 2, wherein the thermoplastic resin of component (A) is a resin composition comprising a polyphenylene ether resin and a polyolefin resin.

11. The resin composition according to claim 1 or 2, wherein the thermoplastic resin of component (A) is a resin composition comprising a polyphenylene ether resin and a polyamide resin.

12. The resin composition according to claim 1 or 2, wherein the thermoplastic resin of component (A) is a resin composition comprising a polycarbonate resin and a polystyrene resin.

13. The resin composition according to claim 1 or 2, wherein the thermoplastic resin of component (A) is a resin composition comprising a polyamide resin and a polystyrene resin.

14. The resin composition according to claim 1 or 2, wherein the thermoplastic resin of component (A) is a thermoplastic elastomer.

15. The resin composition according to claim 1 or 2, further comprising (C) at least one monophosphoric acid ester compound represented by general formula VI:

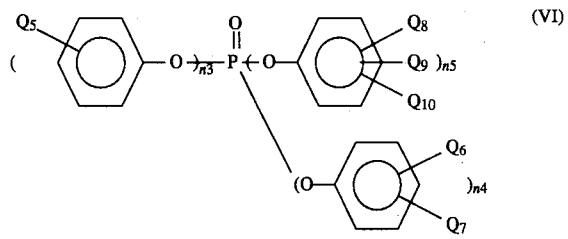

wherein $Q_5$, $Q_6$, $Q_7$, $Q_8$, $Q_9$ and $Q_{10}$ independently represent a hydrogen atom or an alkyl group having 1 to 9 carbon atoms; and $n_3$, $n_4$ and $n_5$ independently represent an integer of 0 to 3, and the total of n3, n4 and n5 is 3.

16. The resin composition according to claim 15, wherein one of the monophosphoric acid ester compounds of component (C) is triphenylphosphate.

17. The resin composition according to claim 15, wherein one of the monophosphoric acid ester compounds of component (C) is tricresylphosphate.

18. The resin composition according to claim 15, wherein one of the monophosphoric acid ester compounds of component (C) is cresyldiphenylphosphate.

19. The resin composition according to claim 1 or 2, wherein $Q_1$, $Q_2$, $Q_3$ and $Q_4$ are methyl groups in the phosphoric acid ester compound of component (B).

20. The resin composition according to claims 1 or 2, wherein the phosphoric acid ester compound of component (B) is a phosphoric acid ester compound represented by general formula V:

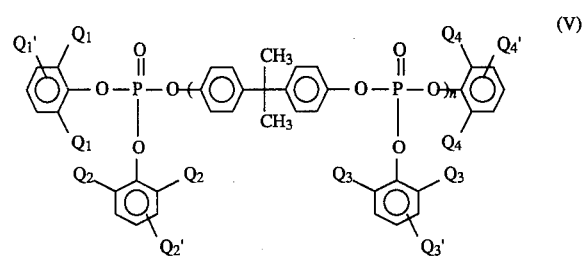

wherein $Q_1$, $Q_2$, $Q_3$ and $Q_4$ independently represent an alkyl group having 1 to 6 carbon atoms; $Q_1'$, $Q_2'$, $Q_3'$ and $Q_4'$ independently represent a hydrogen atom or an alkyl group having 1 to 6 carbon atoms; and n represents an integer of 1 or more.

* * * * *